United States Patent Office 3,676,190
Patented July 11, 1972

3,676,190
GRAFT COPOLYMERS AND PROCESS OF MAKING SAME
Yvan Landler, 12 Boulevard Desgranges, Sceaux, Seine, France, and Pierre Henri Lebel, 290A Avenue Napoleon Bonaparte, Reuil-Malmaison, France
No Drawing. Continuation-in-part of applications Ser. No. 490,108, Feb. 23, 1955, Ser. No. 697,773, Nov. 27, 1957, now abandoned, Ser. No. 712,322, Jan. 31, 1958, now abandoned, and Ser. No. 767,767, Oct. 17, 1958, now abandoned. This application Jan. 7, 1964, Ser. No. 336,145
Claims priority, application France, Mar. 3, 1954, 664,578; Nov. 24, 1956, 9,995; Jan. 31, 1957, 730,947; Feb. 2, 1957, 731,050; June 14, 1957, 741,122; Oct. 18, 1957, 749,811; Brazil, Nov. 14, 1957, 60,876
Int. Cl. C08f 15/00, 21/00
U.S. Cl. 117—76
36 Claims

ABSTRACT OF THE DISCLOSURE

A process for making substantially pure graft polymers comprises the steps of subjecting an organic polymer having a molecular weight of at least 1500 to the action of ozone at a temperature not exceeding 130° C. to form an ozonized polymer and then reacting the ozonized polymer with at least one polymerizable ethylenically unsaturated monomer to form a graft copolymer, the ozonized polymer being the sole added grafting catalyst and the graft copolymer containing at least 5% polymer substrate. The monomer may be in vapor form. The process may, if desired, be applied to shaped objects so as to form a graft copolymer only at the surface of the object. In this event, the polymer is shaped into the form of the desired polymeric object at least prior to reacting the ozonized polymer with the ethylenically unsaturated monomer. There is also disclosed a process for modifying linear polyesters free from aliphatic unsaturation and having linking groups characterized by the presence of at least one hetero atom in the chain, comprising treating such polyesters with ozone and then with a fluid organic compound containing carbon-to-carbon aliphatic ethylenic unsaturation. The resulting products are also disclosed.

---

This invention relates to graft copolymers, and this application is a continuation-in-part of our copending application Ser. No. 490,108, filed Feb. 23, 1955 and now abandoned, and is a continuation-in-part of Ser. No. 697,773, filed Nov. 27, 1957, Ser. No. 712,322, filed Jan. 31, 1958 and Ser. No. 767,767 filed Oct. 17, 1958 all now abandoned.

So-called graft copolymers are copolymers of a chemical structure which is characterized by long sequence of monomer segments A on which are chemically bonded branches or long sequences of segments of another monomer B. This can be shown schematically as follows:

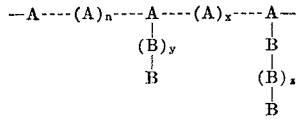

The various values, $n$, $x$, $y$ and $z$ indicate one or more monomer units.

Graft copolymers are of significant practical importance owing to the fact that their properties are significantly different from those of conventional copolymers of the two monomers A and B which are schematically represented as ABABABAB . . . .

Several processes for the preparation of graft copolymers are already known. One of the best known of such processes consists in inducing the polymerization of a monomer B by decomposing a monomeric free radical yielding catalyst in the presence of a polymer A. A certain fraction of the polymerized B monomer will be chemically bound to the polymer A by the so-called "transfer mechanism."

It has been shown experimentally (R. A. Hayes, "Polymeric Chain Transfer Reactions—Polymerization of Some Vinyl Monomers in the Presence of Vinyl Polymers," published in Journal of Polymer Science, 11, (1953) No. 6 pp. 531–537) that graft copolymers obtained by transfer mechanism contain in most cases at least 50% and even more of a homopolymer. Thus the end product obtained consists in general of a mixture of three dissimilar components, viz the polymer A, the polymer B, and the graft copolymer AB. The separation of the graft copolymer AB is generally not industrially possible and the properties of this mixture are generally very poor.

Indeed, it has been shown that it is not possible to obtain homogeneous mixture of two or more dissimilar polymer (A. Dobry, J. Polymer Science 2 (1947) p. 90). Such mixtures give cloudy products with microscopic or macroscopic phase separation and with very poor properties and have little practical utility.

It is an object of the invention to provide a method for producing substantially pure graft copolymers.

It is a further object of the invention to provide graft copolymers having valuable properties.

It is also an object of this invention to provide a new process for producing products embodying graft copolymers.

In accordance with our invention we produce substantially pure graft copolymers by submitting a polymer to the action of ozone to form labile functions, chemically bound on to the polymer and capable of inducing the polymerization of a monomer by a socalled free radical mechanism, and then subjecting the thus-obtained ozonized polymer which thus acts as grafting catalyst in the presence of a monomer under conditions which decompose the labile function introduced on the polymer, to produce reactive polymeric units which inter-react with the monomer to produce the grafted product.

In most cases these substantially pure graft copolymers are characterized by the absence of any homopolymer. Even in the very few cases, where some homopolymer is present, its percentage, variable according to the nature of the constitutents and to the working conditions, is always small e.g. 5%, so that the above mentioned weakening of the properties due to phase separation is avoided. Such pure graft copolymers are characterized by good transparency, improved properties, and by the impossibility of extracting homopolymer by selective solvents. When these graft copolymers are brought into solution, no separation can be observed.

The process of preparing graft copolymers wherein monomers B are polymerized in the presence of ozonized polymers A in accordance without invention has, inter alia, two important practical advantages, viz it is readily carried out on a large scale and it makes possible the production of new grafted products which are substantially free from homopolymers of A and B.

An entire polymer mass in dry particulate form or in the form of an emulsion or solution can be subjected to the grafting operation, or the polymer can be shaped into a predetermined object having a continuous surface and the polymer-object can then be subjected to a surface grafting procedure.

The term "polymer" is used in this specification and in the claims in a generic sense in accordance with the definition contained in chaper 1, more particularly page 16 et seq. of "Fundamental Principles of Polymerization"

by G. F. D'Alelio and includes compounds formed from one or more kinds of monomers.

According to this definition "oligomers" as defined on page 20 of the D'Alelio book are without the scope of the invention. The invention is particularly applicable to macromolecules having a molecular weight greater than 2,000.

Thus the term polymer includes not only homopolymers, copolymers and interpolymers as these terms are known in the art but it also includes a mixture of two or more homopolymers or of two or more copolymers, or of at least one homopolymer with at least one copolymer, as well as homopolymers, copolymers or mixtures thereof which have been chemically modified as by vulcanization, cross-linking, esterification, oxidation, and the like.

Examples of polymers, suitable for use as backbone polymers, in accordance with our invention for the preparation of graft copolymers are natural rubbers, synthetic rubbers obtained from dienes, butyl rubber, vinyl polymers including halogenated vinyl polymers, and, in general, the homopolymers, copolymers and inter-polymers of the polymerizable olefinic compounds containing at least one C to C aliphatic double bond group, such as the polymers of maleic acid and maleic acid esters, tetrahaloethylenes, and vinyl-type compounds. Particularly preferred are the polymers of the vinyl-type and vinylidene-type monomers, i.e. compounds containing at least one $CH_2=CH$ or $CH_2=C<$ group. Examples of the vinyl-type and vinylidene-type polymers and the polymers of the butadienes, such as butadiene-1,3,2,3-dimethyl-butadiene-1,3, piperylene, isoprene, chloroprene, aromatic compounds such as styrene, alpha-methylstyrene, dichlorostyrene, vinyl naphthalene and vinyl phenol, polymers of the unsaturated acids, such as acrylic acid and the alpha-alkyl substituted acrylic acids, such as alpha-methyl and alpha-butyl acrylic acid, polymers of the esters and halogen derivatives of these unsaturated acids, such as methyl acrylate, methyl methacrylate, butyl-methacrylate, alpha-chloromethyl acrylate and propyl acrylate, the polymers of the vinylidene halides such as vinylidene chloride and vinylidene bromide, the polymers of the vinyl esters of inorganic acids, such as the halogen acids, and hydrocyanic acid such as vinyl chloride, vinyl bromide, acrylonitrile, and methacrylonitrile, polymers of the vinyl esters of the monocarboxylic acids such as vinyl acetate, vinyl chloroacetate, vinyl benzoate, vinyl laurate, vinyl valerate, and vinyl caproate, the polymers of the vinyl esters of the polycarboxylic acids, such as divinyl succinate, divinyl adipate, vinyl allyl phthalate, vinyl methallyl pimelate and vinyl methyl glutarate, the polymers of the vinyl esters of the unsaturated acids, such as vinyl acrylate, vinyl crotonate, and vinyl methacrylate, and the polymers of the vinyl ethers such as vinyl methyl ether, vinyl ethyl ether, vinyl butyl ether, and vinyl allyl ether, vinyl isobutyl ether, and the vinyl ketones, such as vinyl butyl ketone, and vinyl ethyl ketone. Further examples of polymers suitable for use are polyvinyl fluoride, polyisobutylene, a copolymer of 10 percent vinyl chloride and 90 percent vinylidene chloride, a copolymer of 25 percent methacrylonitrile and 75 percent methyl methacrylate, a copolymer of 40 percent styrene and 60 percent vinyl chloride, a copolymer of 50 percent vinyl fluoride and 50 percent ethacrylonitrile, an interpolymer of 5 percent methyl methacrylate, 30 percent methylstyrene and 65 percent methacrylonitrile, and interpolymer of 30 percent vinylidene chloride, 20 percent vinyl chloride and 50 percent methyl methacrylate, and an interpolymer of 3 percent vinyl acetate, 40 percent vinyl butyrate, 30 percent methyl methacrylate and 27 percent methacrylonitrile.

Further examples of the polymers that may be used in the process of this invention are cellulose, cellulose esters and cellulose ethers, such as cellulose acetate, cellulose nitrate, cellulose propionate butyrate, cellulose acetobutyrate, methyl cellulose, ethyl cellulose, butyl cellulose, and propyl cellulose; phenol aldehyde condensation polymers, such as phenol-formaldehyde polymers, phenol-acetaldehyde polymers, resorcinol-formaldehyde and resorcinol-acetaldehyde polymers; alkyd resins, such as the polyesters of a glycol and phthalic acid, of 1,3-pentanediol and succinic acid, of a glycol and glutaric acid, and esters of adipic acid; polyamides, such as those obtained by reacting trimethyladipic acid with hexamethylenediamine, polymers known in the art as nylon 6.10 and nylon 6.6, and the like; polymers of ethylene oxide and tetrahydrofuran, polyethylene, polypropylene, polytetrafluoroethylene, polytrifluorochloroethylene; polymers of the carbonic acid esters of the unsaturated diols, such as butadiene-3,4 carbonate; polymers of the unsaturated esters of the unsaturated acids, such as diethyl fumarate and diethyl maleate; polyurethanes, which are reaction products of polyesters and diisocyanates, for example the products sold under the trade name Vulkollan by Bayer of Leverkusen, Germany. Our process is also applicable to the grafting of silicones such as dimethylpolysiloxanes and the like, aminoplast resins such as ureaformaldehyde polymers, anilineformaldehyde polymers, and the like, natural resins such as rosin and the various natural gums, and derivatives such as ester gum, and the like.

Thus, the polymers which are suitable for ozonization and grafting in accordance with our invention include those which contain either a double bond or a tertiary hydrogen atom, i.e. an oxidizable hydrogen atom attached to a tertiary carbon atom, but the invention is not limited to such polymers.

The monomer which is grafted to the backbone polymer in accordance with our invention is suitably, although not exclusively, a vinyl compound, viz a compound having at least one $CH=C<$ group in the molecule, i.e. a methylene group connected by a double bond to another carbon atom. It will be understood that mixtures of monomers as well as the individual monomers may be used to graft a polymer or a mixture of polymers.

Examples of such compounds include the conjugated, open-chain dienes such as the butadiene-1,3, hydrocarbons including butadiene-1,3, isoprene, 2,3-dimethylbutadiene-1,3, and the like, chloroprene, 3-cyanobutadiene-1,3, piperylene and the like, trienes such as myrcene, mixtures of conjugated dienes with vinyl and vinylidene compounds, such as vinylidene chloride, styrene, p-chlorostyrene, 3,5-dichlorostyrene, p-methoxystyrene, acrylic and alpha-alkyl-acrylic acids, their esters, nitriles and amides such as acrylic acid, methacrylic acid, methyl acrylate, octyl acrylate, methyl methacrylate, lauryl methacrylate, acrylonitrile, alpha-chloroacrylonitrile, methacrylonitrile, dimetheyl acrylamide and the like, vinylpyridine, vinyl benzoate, vinyl ketones and vinyl ethers, vinylcarbazole and the like, compounds copolymerizable with the dienes, such as isobutylene, diallyl maleate, 1,4-divinylbenzene and the like, compounds containing both olefinic and acetylenic bonds such as vinylacetylene, vinyl ethynyl carbinol and the like, vinylidene compounds containing only one carbon to carbon double bond such as the vinyl compounds including vinyl chloride, vinylidene chloride, styrene, p-chlorostyrene, 3,5 dichlorostyrene, p-methoxystyrene, acrylonitrile, methacrylonitrile, alpha-chloroacrylonitrile, methyl acrylate, ethyl acrylate, methyl methacrylate, butyl ethacrylate, dimethyl acrylamide, vinyl methyl ketone, vinyl methyl ether, vinylpyridine, vinyl acetate, vinyl propionate, vinyl benzoate and the like, isobutylene, ethylene, and other monoolefinic polymerizable compounds. The above-mentioned vinylidene compounds may be copolymerized with one another or with other unsaturated polymerizable materials such as diethyl maleate, diethyl fumarate, maleic acid, maleic anhydric and the like.

In addition to monomers characterized by the $$CH_2=CH-$$

or $CH_2=C<$ group, our process is also applicable to monomers characterized by the 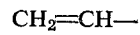 group, such as tetrafluoroethylene and the like which may be used alone or in admixture with one or more monomers of this group or of the vinyl group set forth above. Thus, our process is generally applicable to the grafting of all monomers susceptible of being polymerized by a free radical mechanism.

It is to be understood that it is preferable to use polymers and monomers free from any polymerization inhibitors or antioxidants. Frequently, commercial monomers contain polymerization inhibitors and, in this case, it is preferable to remove the inhibitors before carrying out the grafting operation. This can be done, for instance, by distillation of the monomer or by other known means.

In the same manner, if the polymer contains inhibitors, it is preferable to remove them by means of some extraction method, that is, by using solvents which dissolve the inhibitors, but not the polymers.

It is also recommended that the polymerization system be free of any polymerization catalyst other than the ozonized polymer itself in order to avoid the formation of non-grafted homopolymers. Thus after ozonization, the zone containing the ozonized polymer is suitably swept free of ozone.

When the entire mass of backbone polymer is to be subjected to the grafting procedure, particularly outstanding results, including high yields, are obtained when the backbone polymer is ozonized in the "dry" state.

By a "dry" state is meant that the polymer is not dissolved, or diluted, or swelled, or dispersed, or emulsified in a fluid organic or inorganic medium. However, a polymer is in a "dry" state even if it is viscous or rubberlike as a result of its molecular weight or its intrinsic physical properties, as long as it is free from a solvent, swelling, dispersing or emulsifying agent.

For best results, the "dry" polymers should be in particulate form in order that the ratio of surface to volume will be as large as possible, so that the largest possible surface of the backbone A will be exposed to the action of the ozone. The use of particulate polymer is of importance in providing a good yield of ozonides and to provide favorable homogeneity of the subsequently formed graft copolymer. Accordingly, the average dimension of the polymer particles which are submitted to the action of ozone should be less than 1 millimeter and, preferably, should be less than 100 microns.

In the case of vinyl resins, for example, very good results have been obtained by using a polymer in powder form with the powder having an average diameter of less than 10 microns. In general, polymers obtained by emulsion polymerization are, after drying, in a sufficiently finely divided state to give an excellent ozonides yield. For instance, most of the vinyl polymers polymerized in an emulsion have an average particle diameter below 20 microns.

In those cases in which the dimensions of the "dry" polymer particles to be used are larger than the values indicated above, reduction of the particle size is readily effected by mechanical means such as grinding. Various methods of reducing the particle size of particles are well-known to those skilled in the art and any convenient method may be used.

The use of the polymer in the form of small particles, although recommended, is not, however, always essential. Indeed, many polymers can have a form having no regular or smooth surfaces, but provided with holes, or pores which are sufficiently numerous and deep to give a surface volume ratio greater than that which would be expected from their average diameter. It is to be understood, therefore, that polymer particles having a large average diameter may also be suitably used.

In other cases, polymers having a relatively large average particle diameter, e.g. of the order of 0.1 to 1 mm. can be submitted to ozonization in a "dry" state, provided the permeability to ozone of the polymers is sufficient to permit the ozone to diffuse rapidly inside the particles.

Ozonization of the polymers in particulate form may be carried out in any convenient vessel such as, for example, in a cylinder into one end of which is introduced the ozone-containing medium which is removed from the other end having been forced to pass through the body of polymer filling the cylinder. However, ozonization may also be effected in an internal mixer of the type generally used to mix powder in a dry state, such as a Werner mixer. The polymer particles are, in this case, submitted to continuous agitation and the ozone-containing gaseous medium admitted at one end of the apparatus flows through the mixer and remains in intimate contact with the polymer particles.

When use is made of polymers, which are difficult to reduce to a powder state, such as natural or synthetic rubbers or certain polyvinylethers, ozonization is readily effected by submitting the polymers to a mixing operation on a cylinder-type mixer and simultaneously admitting the ozone-containing medium over the cylinders. In this case, the cylinder mixing equipment, such as the mixer generally used in the rubber industry, is provided with a cover during the mixing of the polymers. The contact surface between the polymers and the ozone is sufficient and continuously renewed so that a homogeneous ozonized polymer is readily obtained. VI. The ozonization steps can be carried out also advantageously by using internal mixing equipment of the so-called Banbury type. It is preferable in this case to cool the mixer during the ozonization operations.

Ozonization of the backbone polymer may be carried out also, while the polymer is subjected to the action of a partial solvent or while the polymer is in the presence of a non-solvent. What is generally employed as the non-solvent and the partial solvent is any liquid which has a swelling action upon the polymer, so that the polymer is "swollen" by the solvent, when, on being immersed for a certain time in the solvent, the polymer absorbs a certain part of it, and increases in weight without becoming dissolved.

Any partial solvent which is inert to the action of ozone may be used and the selection of the solvent or non-solvent is readily effected by reference to solubility tables of the particular polymer being handled. The following are illustrative of suitable partial solvents for representative polymers: polyethylene-carbon tetrachloride; polystyrene-methanol; polyvinyl chloride-carbon tetrachloride; polyvinyl chloride-dichloroethane; polystyrene-propanol; butadiene acrylonitrile copolymer (Hycar 1041)-cyclohexane; polypropylene-cyclohexane; polyacrylonitrile-carbon tetrachloride; polyvinyl acetate-water; cellulose-water.

The ozone treatment of the polymer to be grated is effected by exposing the polymer in a suitable vessel to a stream of ozone or a gaseous stream containing ozone, e.g. air or oxygen containing ozone. When an air or oxygen stream is employed, the content of ozone is advantageously 0.1 to 8%, preferably 0.5 to 3%, by weight. Ozonization is carried out by subjecting the polymer to the action of ozone at the rate of 0.5 to 200 grams, preferably 1 to 100 grams, per hour (calculated as 100% ozone) per kg. of polymer during 0.5 to 2000 minutes, preferably 1 to 600 minutes. The temperature of the polymer during the ozonization steps must be maintained between —30 to 130° C. preferably between 0 to 100° C.

The decomposition of the labile function formed on the ozonized polymer being subjected to grafting and forming the backbone polymer is effected in any convenient manner known to the art, but advantageously it is effected by the action of heat, e.g. by exposing the polymer to temperatures of 20 to 200° C., preferably 30 to 130° C., or it is effected by the action of reducing agents of the type used in the so-called Redox polymerization system which is described, for example, by R. G. K. Bacon in volume 42 of the Transactions of the Faraday Society (1946), page 140 et seq. Reducing agents of this type are exemplified by, but not limited to, oxalic acid, triethylene tetramine, dimethylaniline and pyridine and ferrous salts.

When decomposition or rupture of the labile ozonized function is effected by means of reducing agents, 0.01 to 5 parts, preferably 0.1 to 2 parts, by weight of the reducing agent per 100 parts of polymer is suitably employed and grafting is carried out at a temperature comprised between −50 to 120° C., preferably between 0 to 100° C.

The grafting step, wherein the polymer and the monomer are subjected to polymerization, is carried out in any vessel suitable for polymerization operations as carried out in conventional processes. Particularly suitable, for example, is an autoclave or a glass polymerization cylinder. It is to be understood that our process is not limited with respect to the type of apparatus in which the several process steps may be carried out and any convenient apparatus appropriate for the purpose may be employed.

The quantity of monomer employed will depend upon the extent of grafting desired. As a general rule the final graft copolymer will contain 0.1 to 1000 parts, preferably 1 to 400 parts by weight of grafted monomer per 100 parts of backbone polymer. In any case the final graft copolymers should contain substantially more than 5% of the backbone polymer, in order to confer some of the property of the backbone polymer to the grafted product.

The grafting step which is a polymerization operation and may therefore be designated as grafting polymerization may be effected by any of the conventional polymerization techniques or systems such as mass or bulk polymerization, solution polymerization, suspension or pearl (bead) polymerization, and emulsion polymerization as well known to those skilled in the polymerization art and as described for example, in "Fundamental Principles of Polymerization" by G. F. D'Alelio, p. 352 et seq. and in "Polymer Processes," C. E. Schildknecht, pp. 31–198. The partial solvents and non-solvents which have already been described for backbone polymers undergoing the step of ozonization can also be employed during the grafting polymerization procedure.

It has been found that unusually excellent results, including a high grafting rate and a uniform homogeneous structure of the finished product are obtained when the monomers to be grafted on the ozonized polymer are employed in the vapor form. In this embodiment of our invention the ozonized polymer is exposed to vapors of the monomer to effect the desired grafting the problems involved in recovery of unreacted ingredients are minimized thereby, inasmuch as the final product is not wetted with residual monomer or with any monomeric solvent that may be used.

If decomposition of the labile functions of the ozonized backbone polymer is effected in the presence of reducing agents and the monomers to be grafted to the ozonized backbone polymer are in vapor form, it is advantageous that the reducing agents be compounds which have a sufficiently high vapor pressure so that when mixed with the monomer the reducing agents also will be present in the proper phase. Examples of such compounds are dimethylaniline, diethylaniline, formaldehyde, formic acid, and the like.

The grafting operation using a monomer in the vapor phase may be carried out, for example, by placing the backbone polymer to be treated into a container which is adapted to be hermetically sealed. The monomer in the liquid state is placed in the bottom of the container, along with the reducing agent if one is employed, and the polymer is suspended above the free level of the liquid so as to be out of direct contact with the monomer. The reactor vessel is then sealed, oxygen is evacuated from it and the vessel is uniformly heated. It is important that all parts of the vessel be at uniform temperature in order to prevent monomer condensation, since otherwise the condensed monomer may fall back upon the polymer, which then would be in direct contact with the liquid medium. Such uniform heating may be effected with steam for example, or any other heating fluid. One convenient method is to use a reaction vessel provided with double walls through which the heating fluid is circulated. Alternatively, the reactor may be immersed in a thermostatic tank, e.g. in an oil bath.

Following the completion of the grafting operation, the reaction mass is treated in accordance with conventional practice in the polymerization art to remove unreacted monomer, the reducing agent (if any) and the like, e.g. by evaporation or by washing the reaction mass with water or alcohol or any other suitable extractive agent and then drying the washed product.

In addition to subjecting an entire polymer mass to a grafting procedure, new and valuable products can be obtained by first shaping the polymer into a predetermined object having a continuous surface and then submitting this object to a process of surface grafting. By a predetermined object is meant any object which has been subjected to a procedure such as molding, extruding, calendering, spinning and the like, which imparts a particular shape to the polymeric object differing from the shape of polymer particles normally obtained directly from the polymerization process. Examples of predetermined polymeric objects which may be subjected to surface grafting include rods, tubes, sheets, threads, cloth, clothes, webs, sponges and bottles. Of course, a polymer-object which has been subjected to surface grafting can be transformed still further, when desirable, into another predetermined shape.

By using the term "surface grafting," it is not meant to limit the polymer "skin" which is grafted with the monomer to a given thickness, indeed the grafting can extend into the entire mass of the object to be treated, particularly when the object has a relatively small dimension in at least one direction.

The thickness of the grafted "skin" of the object is determined by the thickness of the ozonized portion of the object, the permeability of this portion of the polymer to be grafted with the monomer and the duration of exposure of this portion to the action of the monomer.

The grafted "skin" of the polymeric object can also be relatively thin. If it is desirable to retain the properties of the original backbone polymer, a substantial core of the original backbone polymer can be retained so that the desired properties of the backbone polymer are preserved thereby.

In accordance with this aspect of our invention, a shaped polymeric is submitted to the action of ozone by placing the object directly in a current of oxygen or air, charged with ozone, or by dipping it into a swelling liquid, or a non-swelling liquid which is characterized by not having an instantaneous solvent action upon the polymer constituent of the object, through which is passed a current of air or oxygen, charged with ozone.

The object thus treated then possesses, at least at its surface, a more or less thick skin which has undergone the action of the ozone. When this ozonized skin is thicker the deeper the ozone is able to act. This varies with the porosity of the polymer object, the length of treatment, and the like. The thickness of the ozonized skin may be increased by carrying out ozonization in a liquid having a more or less swelling action upon the object as indicated above.

The thus-ozonized object is then placed in the presence of at least one monomer, and there can also accompany the monomer a solvent or dispersant for the monomer, which may or may not have a swelling action upon the polymer constituent of the object. Particularly good results are obtained when the ozonized polymeric object is treated with monomer which is in the vapor phase.

Polymerization is then caused to take place by causing a decomposition of the labile functions of the polymer in accordance with techniques already described. When it is desired to reduce the proportion of homopolymers, it is advantageous to operate in the absence of any polymerization catalyst other than that formed by the action of the ozone on the polymer, viz. the ozonized polymer itself.

The polymer thus formed at the surface of the polymer by polymerization of the monomer in the presence of the surface-ozonized polymer object is chemically bound to the object so treated.

In accordance with a modified form of the surface grafting process the object is formed from a pre-ozonized polymer. Thus, the entire polymer mass is first ozonized as already described and then formed into the object to be surface grafted. In this case, the ozonized polymer is shaped by any known technique but under conditions such that the labile functions produced on the polymer by the ozonization do not become entirely decomposed, e.g. at relatively low temperatures.

The ozonized polymeric object thus prepared, is then placed in the presence of a monomer as described above, preferably shut off from the air, and which may be accompanied by a dispersant or swelling medium, and decomposition of the product of ozonization is then effected and the monomer present polymerizes itself and is chemically bound to the surface of the object.

In accordance with another modified aspect of the surface-grafting process, the object is first coated with a polymer which absorbs the ozone more rapidly than the polymer of which the object itself is formed, and the thus coated object is then ozonized in the manner described. The surface-ozonized object is then treated in accordance with the operations set forth above in the presence of a monomer. The new polymer so formed is chemically bound to the superficial skin covering the object.

Treatment by our process of surface grafting generally results in improvement of the following properties of the polymers; corrosive chemical agent resistances, solvent resistance; hydrofugation, ignifugation, wettability, dye affinity, and a decrease of electrical charge accumulation and of tumbling during washing.

Consequently, tubes or pipes treated in accordance with our process may be used for conveying chemical agents. Threads of polymers treated by our process may be used for weaving. Similarly, sheets or films of polymers which have been subjected to treatment in accordance with our process may be used for dyed films and photographic films without electrical charge accumulation.

The following specific examples are illustrative of our invention without being limitative thereof and in these examples all parts are by weight and, unless otherwise specified, the ozone containing gaseous medium contain 2% by weight of ozone. Unless indicated, vacua employed during the grafting polymerization step means a partial molecular oxygen pressure of 0.1 mm. Hg or less.

In the following examples, unless indicated the ozonization steps is carried out at 25° C.

EXAMPLE 1

One kilogram of butyl rubber, of the GR-I type, was submitted to a continuous working on a two-roll mixing machine. The cover of the machine was then closed and oxygen containing 2% ozone was flashed through. The flow of ozone was at the rate of 40 grs. per hour and the flow was continued for 20 minutes. To 100 parts of the butyl rubber so treated were then added 10 parts of acrylic acid and this mixture was introduced into a glass polymerization cylinder. All of the air was evacuated and the cylinder was sealed and heated at 100° C. for 12 hours. The product recovered from the glass cylinder had less rigidity than the butyl rubber initially used. When the product thus obtained is dissolved in cyclohexane and precipitated in alcohol, one can see that, after repeating this treatment twice, it is possible to obtain, after drying, a product which upon chemical analysis shows the presence of acid groups in the polymer. This proves that the acrylic acid has been chemically fixed on the butyl rubber during the polymerization reaction.

If the same polymerization treatment is carried out with using butyl rubber which has not been submitted to the action of ozone, the polymer recovered, after heating and after purification, will not show any trace of the acid groups.

The graft copolymer above described has a better adherence to metals than the non-grafted butyl rubber. Furthermore, the grafted butyl rubber can be vulcanized by bivalent metallic oxides.

EXAMPLE 2

One kilogram of butyl rubber is submitted to the action of ozone under the same conditions as outlined in Example 1, except that ozonization is continued for one hour. To 100 parts of the ozonized product were added 100 parts of isoprene monomer, the incorporation of the isoprene monomer being effected on a two-roll mixer. At the end of the mixing operation, which resulted in the formation of a smooth blend, 2 parts of dimethylaniline were added and the mixture was completed. The mixture was placed in an autoclave from which air had been evacuated. The autoclave was heated at 60° C. for 24 hours. After drying, there were obtained 130 parts of polymerized product. Apart from a small fraction of the product which had become insoluble, the major part could be dissolved in benzene and precipitated by means of ethyl alcohol. By determining the amount of polymer-precipitated as a function of the amount of ethyl alcohol added and by chemically analyzing the different fractions precipitated, it could be observed that the precipitation curves were radically different from those obtained by precipitating a mechanical mixture of butyl rubber and polyisoprene. This showed clearly that the polyisoprene was chemically bonded, viz grafted, on the butyl rubber backbone. If the above-described polymerization is carried out under the same conditions, but using a butyl rubber which has not been subjected to the action of ozone, it is not possible to observe any increase in the weight of the polymer even after heating and subsequent drying.

Butyl rubber grafted by means of the polyisoprene above-described can easily be mixed with natural rubber or with GR-S. The vulcanized mixture possesses good mechanical properties, showing that the grafting of butyl rubber by means of isoprene has made the butyl rubber compatible with natural rubber and with GR-S. These mechanical mixtures have less air permeability than natural rubber or GR-S alone.

EXAMPLE 3

To 100 parts of butyl rubber ozonized under the same conditions as those described in Example 2, were added 70 parts of styrene monomer and 10 parts of dimethylaniline. This mixture was submitted to polymerization reaction in an autoclave under a vacuum of 0.1 mm. partial oxygen pressure for 8 hours at 40° C. After drying, there were obtained 140 parts of a product showing by infrared analysis the presence of polystyrene. The precipitation curve obtained by adding increased amounts of ethyl alcohol to the benzene solution of the product was completely different from those obtained by fractional precipitation of a mechanical mixture of butyl rubber and polystyrene, or those obtained from a product resulting from the polymerization of styrene in the presence of non-ozonized butyl rubber. The precipitation curve of the grafted polymer is also completely different from that of the product obtained by the polymerization of styrene by benzoyl peroxide in the presence of non-ozonized butyl rubber. If 50 parts of the grafted product are mixed with 100 parts of GR-S, it can be observed that, after vulcanization, the tensile strength of the product is superior to that of a vulcanized mechanical mixture of 100 parts of GR-S with 50 parts of the product obtained by polymerizing with benzoyl peroxide 50 parts of styrene in the presence of 100 parts of butyl rubber. This shows the advantage of the process which, according to the invention, permits the preparation of homogeneous graft copolymers of styrene with butyl rubber.

EXAMPLE 4

100 parts of natural rubber of the smoked sheet No. 1 type are submitted to the action of ozone under the same conditions described in Example 1. A mixture prepared from 100 parts of the ozonized rubber, 30 parts of acrylonitrile monomer, and 2 parts of dimethylaniline, was placed in an autoclave which was heated under vacuum at 50° C. for 8 hours. After drying, 125 parts of the product were obtained which had very good resistance to oil and to the usual organic solvents, including hydrocarbon solvents of petroleum origin, and the product withstood well temperature at which natural rubber cannot be used.

EXAMPLE 5

One kilogram of commercial polyvinyl isobutyl ether, sold under the trademark of "Opanol C" was submitted to the action of ozone on a two-roll mixer for one hour, under the same conditions described in Example 1. A mixture of 100 parts of the ozonized polymer, 20 parts of styrene monomer and 10 parts of methacrylic acid was heated in an autoclave at 100° C. for 8 hours. After drying, 118 parts of polymerized product were obtained. Chemical analyses showed that the product was composed of 100 parts of polyvinyl isobutyl ether, 10 parts of styrene and 8 parts of methacrylic acid. Less than 2 parts of the product were only soluble in petroleum ether (boiling point between 50–70° C.) which showed that the major part of the polyvinyl ether had been grafted by the two monomers. The graft copolymer obtained showed a lesser tendency to cold flow than polyvinyl isobutyl ether and it could be vulcanized by bivalent metallic oxides.

EXAMPLE 6

In this example the polymer backbone which was grafted consisted of a mixture of two polymers, viz polyvinyl chloride and a copolymer of butadiene with acrylonitrile. Such a polymer mixture is in powder form and is sold in commerce under the trademark of "Geon Polyblend 503." Three kilograms of the mixed polymer were ozonized under the same conditions described in Example 1. The ozonized polymer was calendered to a 1 mm. thickness and then cut into small bits approximately 1 cm. on a side. The grafting reaction was carried out in a stainless steel vessel. A mixture of 100 parts of the ozonized mixed polymer (Geon Polyblend 503) with 50 parts of acrylonitrile monomer were placed in the vessel which was closed and under vacuum and heated at 100° C. for 5 hours. At the end of this treatment, 130 parts of graft copolymer were recovered. Articles prepared from this grafted polymer showed an approximate 15° heat resistance increase, as determined by the so-called Z.S.T. method (no strength temperature).

EXAMPLE 7

Into a glass-tube of 10 cm. diameter and 40 cm. in length were introduced one kilogram of polyethylene in powder form. Such polyethylene is sold in the trade under the "Telcothene" trade name. Oxygen containing ozone is passed through the glass-tube for three hours. The flow of ozone was 40 g./hour. To 100 parts of the resulting ozonized polyethylene there was added a mixture of 1000 parts distilled water, 300 parts of acrylonitrile monomer, 3 parts of Triton X301, which is alkyl aryl polyether sodium sulfate, and 0.2 part of sodium hyposulphite. This mixture was introduced into an autoclave and heated at 60° C. for 5 hours with continuous agitation. After drying, 400 parts of the grafted product were obtained which were found is to be insoluble in dimethylformamid, which showed that practically all of the polyacrynitrile was chemically bonded with the polyethylene. The product could be calendered easily between 100/130° C.

EXAMPLE 8

In a Werner type mixer having a 10 liter volume were introduced 3 kilograms of a particulate butadiene-styrene copolymer, in the proportion of 15–85, which is sold under the trade name "Hycar 2007." Oxygen containing ozone was passed through the mixer for two hours with continuous agitation. The flow of ozone was 40 grams per hours. A mixture of 100 parts of this ozonized product and 500 parts of styrene monomer was heated in an autoclave for 8 hours at 100° C. After drying and evaporation of the free styrene monomer, 480 parts of graft copolymer are recovered. Molded articles produced from this product show an excellent impact strength even at low temperature.

EXAMPLE 9

Three kilograms of polystyrene in powder form were submitted to the action of ozone in a Werner type mixer for 30 minutes, ozone being introduced at the rate of 60 grams per hour. A mixture of 500 parts of ozonized polystyrene, 2000 parts of petroleum ether, having a boiling point between 100–120° C., 150 parts of acrylonitrile monomer, and 5 parts of dimethylaniline was heated in an autoclave under vacuum, for two hours, at 80° C. with continuous agitation. At the end of this operation, and after drying, a grafted product is obtained which contained 20% acrylonitrile. This grafted product has excellent heat resistance and can be used continuously at 115° C.

EXAMPLE 10

Three kilograms of polystyrene in powder form were ozonized for three hours under the same conditions described in the preceding example. A mixture of 500 parts of the resulting ozonized polystyrene, 2000 parts of water, 60 parts of butadiene, 10 parts of glucose and 0.1 part of ferrous sulphate was heated in an autoclave under vacuum at 50° C. for 8 hours with agitation. The grafted product obtained contained from 5 to 7% combined butadiene and exhibited better impact strength than polystyrene.

EXAMPLE 11

100 parts of polystyrene in powder form ozonized in the manner described in Example 9 were mixed with 25 parts of vinylcarbazol. This mixture was heated in an autoclave at 90° C. When the vinylcarbazol had melted, air was evacuated from the autoclave in order to have not more than 0.1 mm. Hg partial oxygen pressure, and the temperature maintained at 90° C. for 6 hours. The grafting of polyvinylcarbazol on the polystyrene was then substantially complete. The grafted product obtained had better heat-resistance than polystyrene.

When the same process is repeated with an oxonized "modified" polystyrene, viz, a so-called shock resistant polystyrene, one can obtain, under the same polymerization conditions, a product which not only possesses better heat-resistance but also better impact strength than the initial polystyrene.

EXAMPLE 12

Three kilograms of polymethyl/methacrylate in the form of a finely divided powder of an average diameter of 0.05 mm. were submitted to the action of ozone under the conditions described in Example 8. A mixture of 100 parts of the ozonized polymer, 15 parts of butyl acrylate monomer, and 0.2 part of dimethylaniline was heated in an autoclave at 50° C. for four hours. At the end of this treatment, 110 parts of the grafted product were obtained, and this product was found to undergo molding much more readily than polymethacrylate.

EXAMPLE 13

Three kilograms of a particulate copolymer of polystyrene-polyacrylonitrile with an 85% styrene content and a 15% acrylonitrile content were ozonized under the same conditions set forth in Example 8, except that ozonization was continued for 30 minutes only. 100 parts of the ozonized copolymer were introduced into an autoclave to which 30 parts of vinyl chloride monomer were added. This mixture was heated with agitation at 50° C. for twelve hours. The resulting product contained 11% of vinyl chloride and was characterized by a better heat-resistance and a better impact-strength than the initial copolymer.

EXAMPLE 14

Three kilograms of a powdered resinous product consisting essentially of polyacrylic acid were ozonized under the conditions set forth in Example 8. This resinous product is manufactured and sold under the trade name "Carbopol 934." Twenty parts of the ozonized product were dissolved in 2000 parts of water containing sodium borate and the pH of the solution was adjusted to a value of 9 by means of sodium borate. 200 parts of acrylonitrile and 0.2 part of dimethylaniline were then introduced into the solution and the mixture was heated in an autoclave under agitation at 70° C. for 5 hours. Analysis of the resulting grafted product showed that practically all the acrylonitrile was polymerized and chemically bonded on the polyacrylic acid. The product could be easily transformed into fibers in accordance with conventional methods for fiber forming, and the product possessed a greater affinity for dyestuffs than pure polyacrylonitrile.

EXAMPLE 15

Three kilograms of polyvinylcarbazol in powder form with a 0.02 mm. average diameter were submitted to the action of ozone under the same conditions described in Example 8. A mixture of 10 parts of the ozonized polymer and 200 parts of acrylonitrile monomer were introduced into a stainless steel vessel and heated at 100° C. for 10 hours under vacuum. At the end of the polymerization reaction it could be observed that substantially all of the acrylonitrile was polymerized. The grafted product obtained was soluble in dimethyl formamide and was insoluble in aromatic hydrocarbons, which shows that all of the polyvinylcarbazol had been grafted by acrylonitrile. The product could be readily transformed into fibers from its solution in dimethylformamide and the fibers obtained could be more easily dyed than fibers of pure polyacrylonitrile.

EXAMPLE 16

500 grams of polytetrafluoroethylene powder were ozonized under the conditions described in Example 8. A mixture of 100 parts of the ozonized polymer, 20 parts of styrene monomer, and 0.01 part of dimethylaniline was introduced into an autoclave. The autoclave was heated under vacuum for 6 hours at 40° C., with agitation. The product obtained did not show a significant weight increase but after washing it several times with benzene in order to dissolve all the non-grafted polystyrene, and after subsequently treating the polytetrafluoroethylene with a solution of 100 parts of benzene, 30 parts of di-butylphthalate, and 1 part of Victoria blue, the product became intensely colored even after several washings with benzene and with ethyl alcohol. If non-ozonized polytetrafluoroethylene were submitted to grafting with styrene and the product was then treated with Victoria blue in the the manner described above, no coloration would remain after the washing operation. This shows again that polystyrene has been grafted on the polytetrafluoroethylene.

EXAMPLE 17

Three kilograms of particulate polyvinyl chloride are ozonized under the same conditions described in Example 8. The polyvinylchloride used was a commercial product sold under the trade name Geon 101 EP. The polymerization was carried out as follows: 100 parts of ozonized polyvinyl chloride, 1000 parts of distilled water, 2 parts of potassium stearate, 0.1 part of sodium formaldehyde sulfoxylate, 50 parts of styrene monomer, and 0.01 part ferrous sulfate were introduced into an autoclave. This mixture was heated under vacuum at 50° C. for 8 hours. At the end of the polymerization operation 120 parts of product were recovered and found to be insoluble in benzene, showing that the polymerized styrene was chemically bonded on the polyvinyl chloride.

EXAMPLE 18

Three kilograms of polyethylene in powder form sold under the trade name Telcothene were ozonized under the conditions described in Example 8. 100 parts of this ozonized polymer were introduced into a steel vessel with 50 parts of vinyl acetate monomer. After evacuation of air, the vessel was heated at 100° C. for 5 hours. The product obtained showed by chemical analysis, which was carried out by saponification, that it contained 18% of vinyl acetate. The product was insoluble in the cold in the usual solvents for polyvinyl acetates, showing that vinyl acetate was chemically bonded on the polyethylene.

EXAMPLE 19

Three kilograms of cellulose acetate in powder form having an average diameter of 0.1 mm. were ozonized under the conditions as described in Example 8. A mixture consisting of 2000 parts of distilled water, 100 parts of ozonized cellulose acetate, 2 parts of Triton X301, 10 parts of methyl acrylate monomer, 0.2 part sodium hyposulfite, and 0.1 part ferrous sulfate was introduced in an autoclave. The autoclave was heated at 45° C. for 5 hours with agitation and under vacuum. After having separated the grafted polymer, it could be seen that all the methyl acrylate had been polymerized and has been chemically bonded on the cellulose acetate. The product so formed could be easily molded and had a better shock resistance than the cellulose acetate which had not been submitted to the grafting reaction.

EXAMPLE 20

Three kilograms of a particulate polyamide type "nylon" 6.10 frequently used for sintering and having an average particle diameter of less than 10 microns were submitted to the action of ozone under the conditions set forth in Example 8. A mixture consisting of 100 parts of the ozonized polyamide, 25 parts of ethyl acrylate, and 0.2 part of dimethylaniline was introduced in the autoclave. The autoclave was heated under vacuum at 40° C. for 5 hours with agitation. An infrared analysis showed that the product obtained contained 9% of ethyl acrylate. After having submitted the product to the action of solvents for polyethyl acrylate, it could be observed that only a very small fraction of polyethyl acrylate could be extracted.

EXAMPLE 21

Three kilograms of powdered polyvinyl alcohol were submitted to the action of ozone in the manner described in Example 8. The polyvinyl alcohol used was a commercial product sold under the trade name Rhodoviol HS.100. The average diameter of the powder was less than 0.1 mm.

The mixture consisting of 100 parts of the ozonized polyvinyl alcohol, 2000 parts of water, 0.2 part of sodium hyposulfite, 1 part of acetic acid, 0.05 part of ferrous sulfate, and 5 parts of trifluorochloroethylene monomer was introduced into the autoclave. After having carefully evacuated the air, the autoclave was heated at 50° C. for 8 hours with agitation. The product polymer was separated and, upon chemical analysis, showed a content of 1.7 parts of polymerized trifluorochloroethylene. The product had better resistance to mineral oils even at high temperature than pure polyvinyl alcohol. When the same process is carried out but with a non-ozonized polyvinyl alcohol, there is no formation of any polymeric trifluorochloroethylene.

EXAMPLE 22

One kg. of polyethylene powder (Telcothene) was ozonized under the conditions described in Example 7. Three polymerization experiments were then carried out in an autoclave, under vacuum, using in each experiment 100 parts of the ozonized polyethylene powder and adding various amounts of ethyl acrylate monomer. In each case the temperature was maintained at 80° C. for 2 hours. A comparative fourth experiment was also carried out in which non-ozonized polyethylene was used. The amount of polyethyl acrylate formed in each experiment was measured by spectral analyses. The results are set forth in Table 1 below:

TABLE 1

| Polymer | Ozonized polyethylene | Ozonized polyethylene | Ozonized polyethylene | Non-ozonized polyethylene |
|---|---|---|---|---|
| Parts by weight of monomer added | 2 | 20 | 100 | 100 |
| Percent by weight of ethyl acrylate in the polymer | 2 | 16 | 45 | 0 |

When the resulting polymers were submitted to extraction with carbon tetrachloride, it was not possible to extract any polymer showing that all the polymerized ethyl acrylate had been chemically bonded on the polyethylene. As can be seen from Table 1, substantially all the ethylacrylate monomer had been polymerized in the first two experiments. In Experiment No. 4, no perceptible polymerization occurred, showing that the treatment with ozone was necessary to obtain a grafted polymer. The grafted polymers thus obtained are softer than polyethylene, they can be easily heat bonded to metals and can be easily printed upon with printing inks.

EXAMPLE 23

Three kg. of polyethylene powder (Telcothene) were ozonized for 2 hours in a Werner type mixer, under conditions corresponding to those described in Example 8. To 100 parts of the resulting ozonized polymer, 40 parts of vinylidene chloride monomer were added and polymerization was carried out at 80° C. for 5 hours, under vacuum. The resulting polymer contained 22% of combined vinylidene chloride. When the same process was carried out without previously ozonizing the polyethylene powder, there was no formation of any perceptible amount of polymerized vinylidene chloride. A test specimen molded from the graft copolymer exhibited a tensile strength greater than 100 kg./cm.$^2$, the starting material before ozonization had a tensile strength of 75 kg./cm.$^2$.

EXAMPLE 24

Five experiments were carried out in each of which there were used 100 parts of the ozonized polyethylene obtained in Example 23. 100 parts of vinylidene chloride and 1.2 parts of various reducing agents were added and the polymerization was conducted in an autoclave, in a nitrogen atmosphere, by maintaining the temperature at 37° C. for 5 hours. The results are tabulated in Table 2 below:

TABLE 2

| Reducing agent: | Percent of vinylidene-chloride in the polymer |
|---|---|
| None | 5 |
| Oxlic acid | 22 |
| Triethylenetetramine | 46 |
| Dimethylaniline | 30 |
| Pyridine | 21 |

The same series of experiments was repeated but non-ozonized polyethylene powder was used. There was no perceptible amount of vinylidene chloride polymerization in any of these experiments.

EXAMPLE 25

To 100 parts of ozonized polyethylene powder obtained under the conditions described in Example 7, 200 parts of acrylic acid and 300 parts of water were added. The mixture was heated under vacuum in an autoclave for 90 minutes at a temperature of 127° C. At the end of the reaction, 210 parts of a white powder were obtained. Upon treating this product with a hot aqueous solution containing 5% of potassium hydroxide, only 1.5 parts of polymer could be extracted, showing that the greater part of the polymerized acrylic acid had been grafted onto the polyethylene.

EXAMPLE 26

Three kg. of Telcothene powder (polyethylene) were ozonized in a 10 liter Werner type mixer. The ozone supply was the same as in Example 8, but ozonization was carried out for 5 hours. One kg. of the resulting ozonized polyethylene was introduced into an autoclave and then 2 kg. of vinylchloride monomer were added. After evacuation of the air, the autoclave was heated at 60° C. for 10 hours. The products obtained contained 41% of polymerized vinyl chloride, and nothing could be extracted by treating the product with tetrahydrofurane. When the same process was carried out with non-ozonized polyethylene, there was no polymerization of vinyl chloride. The product obtained could be calendered at 120° C. to give a transparent film.

EXAMPLE 27

To 10 parts of ozonized polyethylene obtained by ozonization as described in Example 26, the following ingredients were added:

| | Parts |
|---|---|
| Water | 200 |
| Styrene | 200 |
| Dimethylaniline | 0.5 |

This mixture was heated in an autoclave, under vacuum, for 90 minutes at 105° C. The product obtained contained 52% of polymerized styrene. Upon adding carbon tetrachloride to this product, no polymer could be extracted, but the polymer was uniformly swollen by the solvent.

EXAMPLE 28

To 100 parts of ozonized polyethylene obtained as described in Example 26 the following products were added:

| | Parts |
|---|---|
| Vinylcarbazole monomer | 100 |
| Water | 400 |
| Dimethylaniline | 0.5 |

This mixture was introduced into an autoclave and heated under vacuum at 120° C. for 2 hours. At the end of the reaction, the vinyl carbazole was completely polymerized and could not be extracted by means of chloroform. The grafted product had better heat distortion properties than polyethylene and had a 10° C. higher "no strength temperature" than polyethylene.

EXAMPLE 29

In a Werner type mixer having a 10 liter volume, there were introduced 3 kg. of a polyvinyl chloride powder sold under the trade name Breon 121. A stream of oxygen containing 2% ozone was passed through the mixer with agitation for four hours. The ozone flow was 40 grams per hour. To 100 parts of this ozonized PVC, there were added 100 parts of vinylidene chloride monomer. The mixture was introduced into an autoclave and heated under vacuum for 4 hours at 80° C. The product obtained contained 41% of polymerized vinylidene chloride. When the same experiment was carried out with non-ozonized PVC, the entire amount of the vinylidene chloride monomer could be recovered at the end of the reaction.

EXAMPLE 30

To 100 parts of ozonized PVC obtained according to Example 29, there were added 50 parts of vinylidene chloride and 1 part of sodium formaldehyde sulphoxylate. The mixture was introduced into an autoclave, which was kept under vacuum. The temperature was maintained at 20° C. for 24 hours. At the end of the reaction, 150 parts of polymer were recovered. When the same experiment was carried out with non-ozonized PVC, the entire amount of vinylidene chloride could be recovered as non-reacted monomer.

EXAMPLE 31

Five grafting experiments were carried out at various temperatures by adding in each experiment 200 parts of acrylonitrile monomer to 100 parts of ozonized PVC. The ozonization of the PVC was effected under the conditions described in Example 29. The polymerization was carried out in an autoclave under vacuum for 2 hours. The results are tabulated in Table 3.

TABLE 3

| No. of experiment | 1 | 2 | 3 | 4 | 5 |
|---|---|---|---|---|---|
| Polymerization temperature, °C | 60 | 80 | 100 | 120 | 140 |
| Percent of acrylonitrile in the grafted polymer | 11.7 | 49.5 | 31.0 | 9.6 | 5.6 |

Upon submitting the final polymers to extraction with tetrahydrofurane, no perceptible amount of polymer could be dissolved, showing that substantially all the PVC had been grafted by the acrylonitrile. When the same experiments were carried out with non-ozonized PVC, no polymerization of acrylonitrile was induced.

EXAMPLE 32

Five grafting runs were carried out using in each 100 parts of ozonized PVC, the ozonization of which had been carried out according to Example 29. In each experiment 100 parts of acrylonitrile monomer and a reducing agent were employed. The polymerization reaction was carried out at 25° C. for 72 hours. A blank run was made with non-ozonized PVC. The polymers thus obtained were tested for tensile strength (T.S.) and for "no strength temperature" (N.S.T.). The test samples were compression molded at 165° C. and 150 kg./cm.$^2$. The results are shown in Table 4.

TABLE 4

| Starting material | Nature of the reducing agent | Parts by weight of reducing agent | Percent of acrylonitrile in the polymer | T.S. in kg./cm.$^2$ | N.S.T. in °C. |
|---|---|---|---|---|---|
| Non-ozonized PVC | Oxalic acid | 2 | 0.1 | 550 | 188 |
| Ozonized PVC | None | | 10 | 350 | 170 |
| Do | Oxalic acid | 2 | 35 | 510 | 230 |
| Do | Triethylene tetramine | 1 | 15 | 475 | 230 |
| Do | Dimethylaniline | 2.4 | 32 | 287 | 230 |
| Do | Pyridine | 1.6 | 22 | 150 | 230 |

EXAMPLE 33

In this example grafting reactions of vinyl acetate on PVC are described. Three kg. of Breon 121 were ozonized under the conditions as described in Example 29. Five grafting runs were carried out at 25° C. in an autoclave for 72 hours with various reducing agents. In each run, 100 parts of ozonized PVC were used to which 50 parts of vinyl acetate monomer were added. A sixth run was made as a blank, using non-ozonized PVC. The tensile strength of the various products was measured on samples molded at 165° C. and 150 kg./cm.$^2$. The results are shown in Table 5.

TABLE 5

| Starting material | Nature of the reducing agent | Parts by weight of reducing agent | Percent of vinyl acetate in the graft copolymer | Tensile strength in kg./cm. |
|---|---|---|---|---|
| Non-ozonized PVC | None | | 0 | 550 |
| Ozonized PVC | do | | 26 | 640 |
| Do | Dimethylaniline | 5.5 | 32 | 690 |
| Do | Tetraethylene pentamine | 9.5 | 30 | 580 |
| Do | Oxalic acid | 5.7 | 30 | 600 |
| Do | Pyridine | 3.7 | 31 | 550 |

No perceptible amount of polyvinyl acetate could be extracted by benzene, showing that all the polyvinyl acetate became chemically grafted onto the PVC.

EXAMPLE 34

To 100 parts of ozonized PVC obtained under the conditions described in Example 29, there were added 10 parts of n-butyl acrylate monomer. The mixture was placed in an autoclave and heated under vacuum for 2 hours at 80° C. After the reaction was complete, the polymer contained 38% of polymerized butyl acrylate. The polymer could be formed into sheets on a calender at 130° C. When the same experiments were repeated but using non-ozonized PVC, no polymerization occurred.

EXAMPLE 35

Three kg. of polystyrene in finely divided powder form were ozonized in the manner described in Example 29, except that ozonization was stopped after 1 hour. The polystyrene used was a polymer obtained by emulsion polymerization and had an average molecular weight of 60,000 and an average particle diameter of 0.5$\mu$. To 100 parts of this ozonized polystyrene there were added 200 parts of vinylidene chloride monomer. This mixture was heated in an autoclave under vacuum for 5 hours at 80° C. The product of the reaction contained 40% of polymerized vinylidene chloride and was self-extinguishing when brought in contact with a flame. When the same experiment was repeated with non-ozonized polystyrene, no polymerization occurred.

EXAMPLE 36

On 100 parts of ozonized polystyrene produced in accordance with Example 35, there was grafted vinylidene chloride, the grafting mixture having the following composition:

|  | Parts |
|---|---|
| Ozonized polystyrene | 100 |
| Vinylidene chloride | 100 |
| Distilled water | 500 |
| Potassium stearate | 12 |
| Potassium chloride | 2.2 |
| Pyridine | 14 |

The polymerization step was carried out in autoclave at 18° C. for 6 hours. The polymer obtained contained 24% vinylidene chloride. When non-ozonized polystyrene was used in a second run, there was no polymerization.

EXAMPLE 37

The operation described in Example 36 was repeated except that 7 parts of ferrous sulfate were used in place of the pyridine. The polymer contained 31% of polymerized vinylidene chloride.

EXAMPLE 38

To 100 parts of ozonized polystyrene obtained in the manner described in Example 35, there were added 100 parts of vinyl chloride monomer and 1.5 parts of oxalic acid. The entire mixture was introduced into an autoclave which was maintained under vacuum for 48 hours at 20° C. The resulting graft copolymer contained 38% of vinyl chloride. This product was insoluble in benzene, which established that all the polystyrene had been grafted by vinyl chloride. When this process was applied to non-ozonized polystyrene, all of the vinyl chloride was recovered after 48 hours of reaction in monomeric form.

EXAMPLE 39

This example illustrates two-stage grafting. Ethyl acrylate was grafted on a polystyrene-acrylonitrile grafted copolymer having a 20% acrylonitrile content, the copolymer being the same as the final product obtained in Example 9. Three kg. of this graft copolymer was ozonized in a 10 liter Werner mixer. A stream of oxygen containing 4% ozone was passed through the mixer under agitation for 1 hour. The ozone flow was 40 grams per hour. To 100 parts of this ozonized graft copolymer there were added 30 parts of ethyl acrylate monomer and the mixture was heated in the mixer at 80° C., for 2 hours, under vacuum. The final product contained 23% of polymerized ethyl acrylate.

EXAMPLE 40

To 100 parts of ozonized polystyrene obtained as described in Example 33 there were added 100 parts of vinyl acetate monomer and the mixture was heated at 80° C. for 10 hours under vacuum in an autoclave. The final polymer contained 42% of polymerized vinylacetate. No extraction of polyvinylacetate could be effected upon treating the product with methyl alcohol. When the same process was applied to non-ozonized polystyrene, there was no observable amount of polymerized vinylacetate.

EXAMPLE 41

500 grams of finely divided cellulose powder was ozonized under the conditions described in Example 39, except that ozonization was continued for 5 hours. To 100 parts of the ozonized cellulose there were added 700 parts of styrene monomer and this mixture was heated in the mixed for 24 hours at 80° C. and then for 24 hours at 120° C. At the end of the reaction, all the styrene was polymerized.

The following two specific examples illustrate the grafting procedure wherein the monomer to be grafted is employed solely in the vapor phase.

EXAMPLE 42

In this example, the grafting process was carried out in a two-stage autoclave wherein the two superimposed compartments are separated by a plate of sintered glass. Stirring means are provided in the upper compartment. 500 cc. vinylidene chloride were inserted into the bottom compartment. One kg. Grade 7, pulverulent polyethylene were placed into the upper compartment, preliminarily ozonized during one hour with a stream of oxygene delivered at a rate of 500 liters per hour and containing 2% ozone by weight.

4 grams oxalic acid were dispersed in the polymer, air was pumped out of the autoclave with a vacuum pump. The stirrer was then continuously actuated and the autoclave was maintained first for 10 hours at a temperature of 25° C. followed by 10 hours at 50° C.

A polymer was obtained containing 26% vinylidene chloride by weight, of perfect homogeneity and free of homopolymers.

EXAMPLE 43

500 grams polyvinychloride Type Gobenyle 513 were ozonized for a period of 2½ hours under similar conditions as to rate of ozone delivery as those described in Example 42. The 500 grams of ozonized polyvinylchloride were then placed into the top compartment of the autoclave described in Example 42. 500 cc. acrylonitrile were charged into the lower compartment. A vacuum was established and maintained in the autoclave and a temperature of 65° C. was maintained therein for a period of 6 hours.

The resulting graft copolymer contained 23% acrylonitrile by weight, completely free of any homopolymer constituents.

In the foregoing specific examples use has been made of a polymer in particulate form which was ozonized and then reacted with one or more monomers. While the particulate form of the polymer gives, as indicated, outstanding results, it is also possible to obtain the advantages of our process and to produce new graft copolymers by using the polymer in the form of a solution or emulsion. This is particularly so in the case of naturally occurring or commonly manufactured emulsions such as natural rubber latex and latices of the various "synthetic" rubbers and resins. The polymer emulsion or latex is prepared by any convenient conventional means, e.g. by emulsion polymerization of the initial reactants or by forming an artificial dispersion of the polymer by well-known processes. Water is the usual dispersion medium for polymer emulsions and emulsifying agents commonly used are soaps and related substances such as sodium oleate, sodium stearate, sodium butylnaphthalene sulfonate, polyoxyethylene, and the like. The preparation of the polymer emulsion, however, forms no part of our invention. Similarly the polymer may be dissolved in a solvent to form a solution, any solvent, such as the hydrocarbon solvents or the halohydrocarbon solvents such as benzene, toluene, carbon tetrachloride, and the like. Any solvent which is non-reactive with ozone and which is effective to dissolve the polymer to be treated may be employed. Generally speaking, the amount of solvent should not be in excess of that needed to form a smoothly flowing solution. The following examples are illustrative of this phase of our invention, all parts being by weight and ozonization being carried out in a sealable bulb or autoclave rather than in a mixer or other device used in the preceding examples.

EXAMPLE 44

Into 100 parts of 40% natural rubber latex, to which had been added 1.2 parts of a polyoxyethylene emulsifier such as the product sold under the trade name Mergital A.O.E. in order to stabilize the latex, there was bubbled a current of oxygen containing 3% by weight of ozone. Introduction of ozone was carried out at room temperature of approximately one hour. The current was controlled in such manner that during the one-hour treatment 16 liters of the gas passed through each liter of the latex. A current of nitrogen was then passed into the latex for several minutes to remove free oxygen and ozone. To the latex were added 70 parts of a mixture consisting of 30% of acrylonitrile, 68.8% of water and 1.2% of a sodium salt of the ester of dihexyl succinate. The reaction mass was raised to 45° C. and the mixture maintained at this temperature under agitation.

At the end of two hours there was obtained a stable rubber latex in which the segments of polyacrylonitrile were chemically bound to the polyisoprene molecules. The product thus obtained from this latex is distinguished by very good resistance to oil, to the usual solvents, and to petrols, and it will withstand temperatures at which natural rubber cannot be used. Analysis of the product showed that it contained 35% of acrylonitrile. No part of the grafted polymer was soluble in dimethyl-formamide, showing that it did not contain free polyacrylonitrile, and only approximately 5% was soluble in benzene.

EXAMPLE 45

Through 100 parts of the stabilized 40% natural rubber latex of Example 42 was passed a current of oxygen containing 3% by weight of ozone at room temperature for approximately one hour, the current being controlled in such a manner that during this period of time 16 liters of the gas passed through each liter of the latex. A current of nitrogen freed from oxygen was then caused to pass through the ozonized latex for several minutes and 33 parts of a mixture consisting of 30% of styrene, 68.8% of water, and 1.2% of sodium stearate were then added. The mass was raised to 45° C. and maintained at this temperature under agitation for three hours. There was thus obtained a stable rubber latex in which the segments of polystyrene were chemically bound to the polyisoprene molecules. The rubber thus modified obtained from this latex had a high modulus, could be extended by adding 10–30% of mineral oils which retaining good mechanical qualities. Moreover its vulcanized products had good abrasion resistance. It could be shown by spectral analysis that there were no fractions of rubber which were not modified by the polystyrene, and that all the polystyrene was chemically bound to the rubber.

EXAMPLE 46

A solution of 5 parts of polystyrene free from monomer in 95 parts of carbon tetrachloride in a glass bulb was treated with a current of oxygen containing 1.5% by weight of ozone which bubbled through the solution for twenty minutes at the rate of 16 liters per hour. The solution was then treated by bubbling nitrogen through it for several minutes. Then 5 grams of acrylonitrile were added, the bulb was sealed in the absence of air, and was raised to 80° C. for two hours. There was obtained a transparent highly viscous solution of a polymer which was precipitated by means of alcohol. Analysis showed that the product contained 40% of polyacrylonitrile. It was soluble in tetrahydronaphthalene in which polyacrylonitrile is not soluble. This indicated that all the polyacrylonitrile was chemically bound to the polystyrene.

EXAMPLE 47

The procedure of Example 3 was followed except that ozonization was carried out on a solution of butyl rubber in cyclohexane. Polymerization and grafting of styrene occurred, but with a lower yield than in Example 3.

EXAMPLE 48

The procedure of Example 5 was followed but ozonization was effected of a solution of polyvinyl isobutyl ether in carbon tetrachloride and grafting of the styrene was effected in the solvent medium.

EXAMPLE 49

A grafted copolymer was produced by applying the procedure of Example 6 to an aqueous emulsion of polyvinyl chloride and of a butadiene-acrylonitrile copolymer, a product sold by the B. F. Goodrich Chemical Co. under the trade name Geon Polyblend 552.

EXAMPLE 50

A graft copolymer was produced in accordance with Example 7 from a solution of polyethylene in 1,1,2,2 tetrachlorethane at 75° C.

EXAMPLE 51

A product corresponding to the product of Example 8 was obtained by applying the process of that example to an aqueous emulsion of a copolymer butadiene-styrene having a high (85%) styrene content.

EXAMPLE 52

The process of Example 12 was followed with an aqueous emulsion of polymethyl methacrylate to produce a corresponding grafted polymer.

EXAMPLE 53

A grafted polymer was produced by applying the procedure of Example 14 to an aqueous alkaline solution of polyacrylic acid.

EXAMPLE 54

The process of Example 15 was used to produce a corresponding grafted polymer from a solution of polyvinylcarbazol in carbontetrachloride.

EXAMPLE 55

A product corresponding to that of Example 17 was produced by applying the procedure of that example to a latex sold under the trade name Geon 652.

EXAMPLE 56

A solution of cellulose acetate in tetra chlorethane was subjected to the treatment described in Example 19 and a corresponding grafted product was obtained.

EXAMPLE 57

The procedure of Example 21 was followed to produce a corresponding grafted product from a 10% aqueous solution of polyvinylalcohol.

In accordance with another feature of our invention, ozonization of the particulate polymer or polymer mixture may be effected while the polymer is disposed in a liquid which has a swelling action upon it, i.e. a partial solvent for the polymer, so that the polymer is "swollen" by the solvent, when, on being immersed for a certain time in the solvent, the polymer absorbs a certain part of it, and increases in weight without becoming dissolved.

Any partial solvent which is inert to the action of ozone may be used and the selection of the solvent or nonsolvent is readily effected by reference to solubility tables of the particular polymer being handled. The following are illustrative of suitable partial solvents for representative polymers: polyethylene-carbon tetrachloride; polystyrene-methanol; polyvinyl chloride-carbon tetrachloride; polyvinyl chloride-dichloroethane; polystyrene-propanol; butadiene acrylonitrile copolymer (Hycar 1041)-cyclohexane; polypropylene-cyclohexane; polyacrylonitrile-carbon tetrachloride; polyvinyl acetate-water; cellulose-water.

The polymer, either powdered or in very thin leaf form, is placed in the liquid, which is suitably maintained under agitation while the ozone-containing gas is passed through it. The following examples are illustrative of this aspect of our invention.

EXAMPLE 58

Into a Werner type mixer, 6 liters of carbon tetrachloride and 600 g. of polyethylene in powder form are introduced. The mixture is agitated and there is passed through it a current of air containing 1% ozone, at the rate of 600 liters per hour, for one hour. The dispersion was then swept with inert gas to eliminate the dissolved ozone and the dispersion was placed in an autoclave which was maintained under agitation and provided with a nitrogen atmosphere. One liter of acrylonitrile were added and the mixture was maintained at a temperature of 115° C. for 6 hours. There were obtained 1350 g. of a graft copolymer.

EXAMPLE 59

Into a Werner-type mixer, were introduced 6 liters of methanol and 600 g. of pulverulent polystyrene and there as passed through the mixture, under agitation, a current of oxygen containing 1.5% ozone at the rate of 200 liters per hour, for 45 minutes. The polystyrene was then filtered, washed in alcohol, and dried. It was then dispersed in 6 liters of methanol, under agitation, in an autoclave. After adding 200 cc. of acrylonitrile, 20 cc. of dimethylaniline, and agitating vigorously for 2 hours at a temperature of 50° C., there were obtained 750 g. of a graft copolymer.

EXAMPLE 60

The process of Example 59 was followed but the methanol was replaced by water. At the end of the ozonization treatment the mixture was freed of ozone and the dispersed mixture was placed in an autoclave. After adding 2 kg. of vinyl chloride and 30 cc. of dimethylaniline, a temperature of 40° C. was maintained for 3½ hours. There were obtained 1050 g. of graft copolymer.

EXAMPLE 61

The process of Example 60 was followed but the water was replaced by a 1% aqueous solution of polyoxyethylene of low molecular weight. At the end of the grafting polymerization reaction there were obtained 1250 g. of grafted copolymer.

EXAMPLE 62

In six liters of carbon tetrachloride were soaked 400 g. of a butadiene acrylonitrile copolymer, of 40% acrylonitrile content in fine leaf form. There was passed through the mixture a current of oxygen containing 1.5% ozone at the rate of 200 liters per hour for 45 minutes. Every 5 minutes the polymer was taken from the mixture and worked in a two roll mixer, then replaced in its ozonization medium in order to obtain a homogeneous dispersion of the products of ozonization on the polymer. The polymer was then placed in an autoclave without the carbontetrachloride, but with 2 kg. of vinyl chloride and maintained at a temperature of 110° C. for 20 hours.

There was obtained a semi-supple mass weighing 975 g. having better overall properties than a mechanical mixture in equal proportions of a butadiene-acrylonitrile copolymer with polyvinyl chloride homopolymer.

In accordance with a still further aspect of our invention, the ozonized polymer in powder form prepared by any of the previously-described ozonization procedures is advantageously subject to grafting polymerization by a suspension polymerization process wherein the ozonized polymer, in powder form, is dispersed in a mixture of water and dispersing agents. While maintaining this reaction mass under strong agitation and in an inert atmosphere, the monomer to be graft polymerized is added and, while decomposing or rupturing the labile ozonized function of the polymer in the manner previously described, polymerization is effected under the conditions employed in the preceding examples. A grafted copolymer in globular, pulverulent or gritty form is obtained.

Dispersing agents suitable for use in accordance with this manner of grafting polymerization include partially, hydrolysed polyvinyl acetate, polyvinyl alcohol, sodium alginate, potassium alginate, polyvinyl pyrrolidone, sodium polyacrylate, potassium polyacrylate, sodium polymethacrylate, potassium polymethacrylate, polyacrylamide, finely divided calcium carbonate, finely divided silicates like talc and magnesium phosphate and in general dispersing agents of the type commonly used for suspension or bead polymerization.

EXAMPLE 63

Ten g. of ozonized powdered polystyrene containing one group of ozonides per 50 styrene segments were dispersed under strong agitation in a mixture of 100 cc. of water, 0.5% of sodium alginate, 25 cc. of acrylonitrile, and 1 cc. of dimethylaniline. After continuing rapid agitation for 2½ hours at the ambient temperature and under a nitrogen atmosphere there were obtained pears of 1 to 1.2 mm. diameter containing 40% polymerized acrylonitrile, of which only 1% is soluble in an aqueous saturated sodium perchlorate solution.

EXAMPLE 64

100 g. of very finely powdered polyethylene which had been ozonized for 6 hours with a current of oxygen containing 1.2% ozone at a rate of 20 liters per hour were added under strong agitation to a mixture of 1000 cc. of water, 2 g. of polyacrylic acid, 1,250 g. of neutral sodium carbonate, 12.5 g. of talc, 0.9 g. of stearic acid, and 250 g. of styrene. After heating in an autoclave, at a temperature of 105° C. for 5 hours, there were obtained pearls of about 2 to 2.5 mm. diameter. The total amount of pearls obtained weighed 340 g.

It will be understood that various changes and modifications may be made in the processes described above without departing from the scope of our invention as defined in the appended claims and it is intended, thererfore, that all matter contained in the foregoing description shall be interpreted as illustrative only and not as limitative of the invention.

The following examples are illustrative of the procedure of "surface-grafting" of a shaped polymer-object, and in these examples all parts are by weight unless otherwise specified. In Examples 65–70 incl. the monomer to be grafted is employed solely in the vapor phase and the ozone-containing gaseous medium contains 2% by weight of ozone; in Examples 71–86 thhe ozone-containing gaseous medium contains 1.5% by weight of ozone.

EXAMPLE 65

A polyethylene film 3 meters long, 15 cm. wide and 0.02 mm. thick was exposed for thirty minutes to a stream of ozone-laden oxygen (2% ozone) delivered at a rate of 50 grams of ozone per hour. The treated film was then placed in a cylindrical stainless steel container 25 cm. deep and 20 cm. in diameter.

The container was hermetically sealed and fitted with an outlet for evacuating the air therefrom. One hundred grams of liquid vinylidene chloride monomer were placed in the bottom of the container and the polyethylene film was suspended above the monomer in the form of a by means of clamps, with the adjacent turns of the film of contact with the surface of the monomer. The container was sealed and evacuated, and was then wholly immersed in an oil bath at 120° C. and allowed to remain for 3 hours.

When the container was removed from the bath and opened, the vinylidene chloride was found to have polymerized and grafted onto the polyethylene film. The film weighed 47 grams as against an inital weight of 7.5 grams prior to the above-described grafting reaction, and was suitable after stretching for use as food packaging.

EXAMPLE 66

A polyvinyl chloride film, plasticized with nitrile rubber in the relative proportions of 60/40, and having a length of three meters, a width of 0.15 meter and a thickness of 0.1 mm., was exposed to ozone under the conditions described in Example 65, except that the exposure to ozone was maintained for only 20 minutes.

The ozonized film was placed in the same reactor vessel employed in Example 65 to which had been added 60 cc. liquid acrylonitrile monomer containing 10% dimethyl aniline.

After evacuation of air, the reactor was immersed in an oil bath at 90° C. and was maintained in the bath for 2 hours. On completion of the reaction the weight of product was found to have increased by 40 g. and was suitable for use as a packaging material, being characterized by low permeability of water vapor and air.

EXAMPLE 67

A 15 cm.-long rigid pipe formed from polyvinyl chloride and having a diameter of 10 cm. and a wall thickness of 5 cm. was exposed to ozone for 1 hour, the rate of ozone flow being the same as in Example 65.

The graft reaction was effected in the reactor used in Example 65 to which had been charged 50 g. of acrylonitrile monomer, a temperature of 110° C. being maintained for 30 minutes. The weight of the polyvinyl chloride tube increased by 13 grams from an initial value of 250 grams during the course of the reaction, the pipe being suspended above the monomer by means of clamps. The grafted pipe thus produced was suitable for use as fuel pipes.

EXAMPLE 68

A cotton fabric weighing 120 grams per sq. meter, 3 meters in length, and 15 cm. in width was exposed to ozone for 3 hours under the conditions described in Example 65. After ozonization, the fabric was introduced into the reactor described in the preceding examples and treated under the conditions described in Example 1 in the presence of 100 grams of vinylidene chloride monomer. The graft reaction was effected at 70° C. for 30 minutes. The weight of the fabric was found to have increased by 5% and the grafted fabric product thus obtained was suitable for use as unshrinkable cloth.

EXAMPLE 69

An annular seal ring of natural ruber weighing 105 grams and having a Shore hardness value of 55, with an inner diameter of 120 mm. and a thickness of 18 mm. was exposed to ozone for 10 minutes under the conditions described in Example 65.

The ozonized ring was then suspended in a sealable vessel containing in its bottom 50 cc. of vinyl acetate monomer containing 0.1% formic acid. After removal of air, the sealed vessel was immersed for 20 minutes in a thermostatic oil tank at 115° C. On completion of the reaction the weight of the ring was found to have increased by 8 grams. The resulting grafted ring was treated with an aqueous sodium hydroxide solution. After this treatment the solvent-resistance of the ring was found to have considerably increased as compared with the original ring and the resulting ring was particularly suitable for use as a connector seal for pipes used in the delivery of gaseous hydrocarbons.

EXAMPLE 70

A non-stretched, 50 deniers monofilament made from high density polyethylene "Hostalene F" and having a length of 50 meters was exposed to ozone under the conditions described in Example 65.

The ozonized filament was suspended in the form of a coil by means of clamps in a sealable vessel containing in its bottom 100 cc. acrylic acid monomer stabilized with copper carylate. Oxygen was evacuated, the container closed and heated to 110° C. for 3 hours. The weight of the initial monofilament increased by 300%.

EXAMPLE 71

A film of stretched polystyrene was soaked for 8 minutes in a bath of methanol through which a current of ozonized air was continuously passed, after which the film was washed for 5 minutes in a bath of alcohol, then dried for 5 minutes in a current of nitrogen. Finally the film was placed in a vessel containing water, acrylamide and dimethylaniline at a temperature of 40° C. and the film was maintained in the vesel for 120 minutes. It will be understood that the dimensions of the vessels, and the speeds of passage through them are variable and are calculated functions of the degree of ozonization, and the rate of grafting desired. The film, after drying, was found to be printable with the usual printing inks in dilution, which could not be done with the initial film of polystyrene, which proved that the state of the surface of the film was modified. This film thus could be used to carry lettering or indicia and serve as a wrapper for merchandise.

EXAMPLE 72

A square piece of polyethylene film having a side dimension of 100 cm. and a thickness of 0.02 mm. was placed in a tight vessel through which air containing ozone was circulated for ten minutes.

The rate of supply of the ozone was 40 grams per hour. After this treatment the film was placed in an autoclave in the presence of 100 cc. of acrylonitrile monomer. After the air was evacuated, the autoclave was heated to 125° C. for 20 minutes.

The film that was recovered from this treatment doubled its weight and was more rigid but was transparent.

If the same operation is carried out but the ozonization is allowed to continue for one hour, the resultant product shows an increase in weight of 400%.

When the resulting products were placed in dimethylformamide they became more flexible but remained insoluble. These products can be used as stretched, heat resistant films.

EXAMPLE 73

A square piece of polyvinyl chloride film plasticized with rubber nitrile in the proportions of 60/40 and having a side dimension of 100 cm. and a thickness of 0.03 mm. was placed in a closed vessel through which an ozonized current of air was passed for 20 minutes.

The rate of supply of the ozone was 40 grams per hour. After this treatment the film was placed in an autoclave in the presence of 100 cc. of acrylonitrile monomer. After evacuation of air, the autoclave was heated to 125° C. for 40 minutes. The film which was recovered after the treatment showed an increase in weight of 250% and could be used as packaging material with low water vapour and air permeability.

EXAMPLE 74

A square piece of cellulose acetate film having a side dimension of 100 cms. and a thickness of 0.01 mm. was placed in a closed vessel through which an ozonized current of air was passed for 30 minutes. The rate of supply of ozone was 40 grams per hour. After this treatment the film was placed in an autoclave in the presence of 100 cc. of vinylidene chloride monomer and, after evacuation of air, the autoclave was heated to 75° C. for one hour.

After this treatment the film showed an increase in weight of 35% and a permeability to water vapor much lower than the original material. It could be used as packaging material.

EXAMPLE 75

Polyacrylonitrile thread was passed for 30 minutes through a bath of carbon tetrachloride through which has passed a current of air carged with ozone. Upon coming out of this bath the thread was washed free of the carbon tetrachloride, to eliminate the ozone which had not reacted with it, when it was dried and passed into a vessel containing 100 parts of alcohol, 30 parts of dimethylformamide, 30 parts of vinyl carbazole and 1.2 parts of dimethylaniline.

After this bath the thread was washed and dried, and could then be dyed with the usual coloring acids, which could not be done wtih the initial thread.

EXAMPLE 76

Thread formed from isotactic polyisopropylene was passed for 5 minutes through a tank through which was also passed a current of oxygen charged with ozone. The thread thus treated was placed in acrylamide monomer and was heated to 105° C. for 5 minutes.

After this treatment the thread could be easily tinted with coloring materials and the resulting coloring was not modified even after the thread had been washed several times. The thread could be used for textile application.

The affinity for dyes of threads of polyisopropylene may be increased by grafting on to the thread by the same methods other monomers such as those of vinyl esters, acrylic esters, methacrylic esters, vinylpyrrolidene, vinylpyridine, and the like.

By the same treatment the accumulation of electrostatic charges on woven materials made from polyisopropylene thread can also be reduced.

EXAMPLE 77

After leaving a spinning trough, and after drying, a thread of regenerated cellulose was passed through a trough filled with water through which some ozone was passed at the rate of 50 grams per hour, then the thread was passed through another trough containing water, 10% acrylonitrile and 1.8% ferrous oxalate, wherein the acrylonitrile became grafted into the thread. The thread then obtained was observed to absorb less water than the thread at the start, even if the quantity of acrylonitrile is small and it could be used for unfolding tissues.

EXAMPLE 78

A square sheet of woven cotton having a side dimension of 1 meter was placed in a closed vessel in which ozonized air was circulated for 30 minutes. The rate of supply of ozone was 40 grams per hour. After this treatment the cloth was placed in an autoclave in the presence of 100 cc. of ethyl acrylate monomer and was heated to 100° C. for 20 minutes in a nitrogen atmosphere.

The cloth which was recovered from this treatment showed less affinity for water than the cloth which had not been treated and could be used for raincoats.

EXAMPLE 79

A square sheet of woven nylon 66 having a side dimension of 1 meter was placed in a closed vessel in which ozonized air was circulated for 30 minutes. The rate of supply of ozone was 40 grams per hour. After this treatment the cloth was placed in an autoclave in the presence of 100 cc. of vinylidene chloride monomer and was heated to 75° C. for 40 minutes in a nitrogen atmosphere.

The cloth which was recovered showed, after having been dried, an increase in weight of 20% and was better able to resist flame than the cloth which had not been treated. The grafted cloth is useful for security clothes and industrial applications.

EXAMPLE 80

A square sheet of woven nylon 66 having a side dimension of 1 meter was placed in a closed vessel through which ozonized air was circulated for 30 minutes. The rate of supply of ozone was 40 grams per hour. After this treatment the cloth was placed in an autoclave in the presence of 15 cc. of acrylamide monomer and was heated to 100° C. for 15 minutes in a nitrogen atmosphere.

The sheet which was recovered showed, after this treatment a greatly reduced tendency to accumulate electrostatic charges, better water vapour transmission, and could be used for undergarments.

EXAMPLE 81

The process of Example 80 was carried out with a sheet of polyacrylonitrile known in commerce under the trade name Orlon. There was obtained a product having a greatly reduced tendency to accumulate electrostatic charges similarly to the result observed in connection with Example 10 and the product was useful as wool type clothes.

EXAMPLE 82

The same process was carried out as in Example 80 but with polyethyleneglycol terephthalate known under the trade name Dacron. A cloth was obtained which has a better water vapor permeability and a greatly reduced tendency to accumulate electrostatic charges. These results are similar to the results obtained in connection with Examples 80 and 81, and this cloth could be advantageously used for shirts.

EXAMPLE 83

A 100 cm. length of polyvinyl chloride tubing free of plasticizer was placed in a bath of carbon tetrachloride through which a current of air charged with ozone was bubbled for 100 minutes. After ozonization the tubing was washed, dried and then placed in a mixture comprising 50% carbon tetrachloride, 48.8% acrylonitrile and 1.2% dimethylaniline at 45° C. for three hours. The tubing thus treated possessed an improved resistance to organic solvents and to temperature compared with the original length of tubing and is suitable for use for conveying aliphatic and aromatic hydrocarbons and their halogenated derivatives.

EXAMPLE 84

A sponge of cellular polyurethane obtained by reaction of a polyester with a polyisocyanate, sold under the trade name of Klemocell and having the dimensions of 20 x 10 x 15 cm. was subjected to the action of ozone for 2 minutes. The output from the ozone generating machine was 20 grams of ozone an hour. The sponge thus treated was put into a container holding 2 cc. of vinyl acetate monomer and after having evacuated the air from the container, the temperature was raised to 100° C. for 10 minutes. The sponge was then washed in water and placed in a 3% aqueous solution of caustic soda which was heated to 60° C. for a period of 10 minutes.

The sponge thus treated became extremely hydrophilous and when placed in water, the sponge immediately sank, whereas a sponge which had not been treated, floated readily. This sponge has utility in toilet sponge.

EXAMPLE 85

A cellular product resulting from the reaction of a polyether with a polyisocyanate was subjected to the action of ozone under the same conditions as are described in Example 84. The sponge thus treated was placed in a container holding 22 cc. of acrylic acid. After the air had been evacuated, the temperature was raised to 100° C. for ten minutes. The product was then washed and placed in an aqueous solution of 3% soda. The product thus obtained had a hydroscopicity just as good as the product described in Example 84 and could be used for toilet or industrial sponges.

EXAMPLE 86

A sponge, identical to the one described in Example 85 was treated under the same conditions, except that the acrylic acid was replaced by monomeric acrylamide. The sponge thus treated possessed an excellent affinity for water and that affinity was shown to be maintained even after prolonged use as a dish-cloth in hot water.

It will be understood that various changes and modifications may be made in the processes described above without departing from the scope of our invention as defined in the appended claims and it is intended, therefore, that all matter contained in the foregoing description shall be interpreted as illustrative only and not as limitative of the invention.

What we claim and desire to secure by Letters Patent:

1. A process for making substantially pure graft copolymers, which comprises the steps of subjecting an organic polymer having a molecular weight of at least 1500 to the action of ozone at a temperature not exceeding 130° C. to form an ozonized polymer, and reacting said ozonized polymer with at least one polymerizable ethylenically-unsaturated monomer to form a graft copolymer, said ozonized polymer being the sole added active grafting catalyst, and said graft copolymer containing at least 5% polymer substrate.

2. A process as defined in claim 1, wherein the reaction of the monomer with the ozonized polymer is effected by heating.

3. A process as defined in claim 1, wherein the reaction of the monomer with the ozonized polymer is effected in the presence of a reducing agent.

4. A process as defined in claim 1, wherein said polymer is a polymer of a monoolefinic compound.

5. A process as defined in claim 1, wherein said polymer is a polymer of a diolefinic compound.

6. A process as defined in claim 1, wherein the polymer is in particular form.

7. A process as defined in claim 1, wherein the polymer is in the form of particles having an average particle size less than 100 microns.

8. A process as defined in claim 1, wherein the polymer is polystyrene.

9. A process as defined in claim 1, wherein the polymer is polyacrylonitrile.

10. A process as defined in claim 1, wherein the polymer is polyvinylchloride.

11. A process as defined in claim 1, wherein the polymer is polyethylene.

12. A process as defined in claim 1, wherein the polymer is a styrene-butadiene copolymer.

13. A process as defined in claim 1, wherein said monomer is in vapor form.

14. A process as defined in claim 13, wherein the reaction of said monomer in vapor form with the ozonized polymer is effected with heating.

15. A process as defined in claim 13, wherein the reaction of said monomer in vapor form with the ozonized polymer is effected in the presence of a reducing agent.

16. A process for making substantially pure graft copolymers, which comprises the steps of subjecting an organic polymer having a molecular weight of at least 1500 to the action of ozone at a temperature not exceeding 130° C. to form an ozonized polymer, and reacting said ozonized polymer with at least one vinyl monomer to form a graft copolymer, said ozonized polymer being the sole added active grafting catalyst, and said graft copolymer containing at least 5% polymer substrate.

17. A process for making substantially pure graft copolymers, which comprises the steps of subjecting an organic polymer in the dry state and having a molecular weight of at least 1500 to the action of ozone at a temperature not exceeding 130° C. to form an ozonized polymer, and reacting said ozonized polymer with at least one polymerizable ethylenically-unsaturated monomer to form a graft copolymer, said ozonized polymer being the sole added active grafting catalyst, and said graft copolymer containing at least 5% polymer substrate.

18. A process for making substantially pure graft copolymers, which comprises the steps of subjecting an organic polymer in the dry state and having a molecular weight of at least 1500 to the action of ozone at a temperature not exceeding 130° C. to form an ozonized polymer, and reacting said ozonized polymer with at least one vinyl monomer to form a graft copolymer, said ozonized polymer being the sole added active grafting catalyst, and said graft copolymer containing at least 5% polymer substrate.

19. A process for making substantially pure graft copolymers, which comprises the steps of subjecting an organic polymer having a molecular weight of at least 1500 in a liquid reaction medium to the action of ozone at a temperature not exceeding 130° C. to form an ozonized polymer, and reacting said ozonized polymer with at least one polymerizable ethylenically-unsaturated monomer to form a graph copolymer, said ozonized polymer being the sole added active grafting catalyst, and said graft copolymer containing at least 5% polymer substrate.

20. A process for modifying linear polyesters free from aliphatic unsaturation and having linking groups characterized by the presence of at least one hetero atom in the chain, comprising treating said structures with ozone and then with a fluid organic compound containing carbon-to-carbon aliphatic ethylenic unsaturation.

21. A process as defined in claim 20, wherein said polyester is polyethylene terephthalate.

22. A process for making shaped, polymeric objects containing graft copolymers only at their surface which comprises the steps of subjecting an organic polymer having a molecular weight of at least 1500 to the action of ozone at a temperature not exceeding 130° C. to form an ozonized polymer, and reacting said ozonized polymer with a polymerizable ethylenically-unsaturated monomer to form a graft copolymer, said ozonized polymer being the sole added active grafting catalyst, said polymer representing at least 5% by weight of the total amount of the resulting graft copolymer, and said polymer being shaped into the form of a predetermined object at least prior to the reacting of the ozonized polymer with the ethylenically-unsaturated monomer whereby said graft copolymer is formed only at the surface of said object.

23. A process as defined in claim 22, wherein said monomer is in vapor form.

24. A process as defined in claim 22, wherein the reaction of the monomer in vapor form with the ozonized polymer is effected by heating.

25. A process as defined in claim 22, wherein the reaction of the monomer in vapor form with the ozonized polymer is effected in the presence of a reducing agent.

26. A process as defined in claim 22, wherein said organic polymer is a polyurethane.

27. A process as defined in claim 22, wherein said organic polymer is polyamide.

28. A process as defined in claim 22, wherein said organic polymer is cellulose.

29. A process for making polymeric objects containing graft copolymers only at their surface which comprises the steps of subjecting an organic polymer having a molecular weight of at least 1500 and shaped into the form of a predetermined object to the action of ozone at a temperature not exceeding 130° C. to form an ozonized polymer, and reacting said ozonized polymer with a polymerizable ethylenically-unsaturated monomer to form a graft copolymer only at the surface of said object, said ozonized polymer being the sole added active grafting catalyst, and said polymer representing at least 5% by weight of the total amount of the resulting graft copolymer.

30. A process as defined in claim 29, wherein said monomer is in vapor form.

31. A process for making polymeric objects containing graft copolymers only at their surface which comprises the steps of subjecting an organic polymer having a molecular weight of at least 1500 to the action of ozone at a temperature not exceeding 130° C. to form an ozonized polymer, shaping the ozonized polymer thus obtained into the form of a predetermined object, and reacting said shaped, ozonized polymer with a polymerizable ethylenically-unsaturated monomer to form a graft copolymer only at the surface of said object, said ozonized polymer being the sole added active grafting catalyst, and said polymer representing at least 5% by weight of the total amount of the resulting graft copolymer.

32. A process as defined in claim 31, wherein said monomer is in vapor form.

33. A process for making polymeric objects containing graft copolymers only at their surface which comprises the steps of coating a first organic polymer having a molecular weight of at least 1500 shaped into the form of a predetermined object with a coating of a second organic polymer having a molecular weight of at least 1500 and different from said first polymer and different from graft copolymers, subjecting the thus-coated object to the action of ozone at a temperature not exceeding 130° C. to form an ozonized polymer from said second polymer, and reacting said ozonized polymer with a polymerizable ethylenically-unsaturated monomer to form a graft copolymer only at the surface of said object, said ozonized polymer being the sole added active grafting catalyst, and said polymer representing at least 5% by weight of the total amount of the resulting graft copolymer.

34. A process as defined in claim 33, wherein said monomer is in vapor form.

35. A process for making shaped polymeric objects containing graft copolymers at their surface which comprises treating the surface of a shaped linear polyester object with ozone to ozonize a surface portion of said polyester object, while retaining a substantial core of unozonized polyester, said linear polyester being free from aliphatic unsaturation and having linking groups characterized by the presence of at least one hetero atom in the chain, and then treating said surface-ozonized polyester object with a fluid organic compound containing carbon-to-carbon aliphatic ethylenic unsaturation.

36. A process for modifying filaments of linear polyesters free from aliphatic unsaturation and having linking groups characterized by the presence of at least one hetero atom in the chain comprising treating said structures with ozone and then with a fluid organic compound containing carbon-to-carbon aliphatic ethylenic unsaturation.

References Cited
UNITED STATES PATENTS

| | | | |
|---|---|---|---|
| 2,837,496 | 12/1952 | Vandenberg | 260—877 |
| 2,542,771 | 2/1951 | Hanford et al. | 260—878 |
| 2,620,324 | 12/1952 | Coover | 260—878 |
| 2,834,749 | 5/1958 | Salyer et al. | 260—878 |

SAMUEL H. BLECH, Primary Examiner

H. ROBERTS, Assistant Examiner

U.S. Cl. X.R.

117—47; 260—4, 17.4, 827, 836, 844, 851, 859, 867, 873, 875, 877, 878, 879, 881, 884, 885, 886